(12) United States Patent
Zhu et al.

(10) Patent No.: US 10,416,777 B2
(45) Date of Patent: Sep. 17, 2019

(54) DEVICE MANIPULATION USING HOVER

(71) Applicant: Microsoft Technology Licensing, LLC, Redmond, WA (US)

(72) Inventors: Robert Zhu, Bellevue, WA (US); Dejun Zhang, Bellevue, WA (US); Pengxiang Zhao, Bellevue, WA (US); Bin Wang, Bellevue, WA (US); Satyendra Bahadur, Bellevue, WA (US); Ying N. Chin, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 155 days.

(21) Appl. No.: 15/238,558

(22) Filed: Aug. 16, 2016

(65) Prior Publication Data

US 2018/0052518 A1   Feb. 22, 2018

(51) Int. Cl.
| | |
|---|---|
| *G06F 3/0484* | (2013.01) |
| *G06F 3/01* | (2006.01) |
| *G06F 3/16* | (2006.01) |
| *G06F 1/16* | (2006.01) |

(52) U.S. Cl.
CPC ............ *G06F 3/017* (2013.01); *G06F 1/1626* (2013.01); *G06F 3/016* (2013.01); *G06F 3/0484* (2013.01); *G06F 3/167* (2013.01); *G06F 2203/04108* (2013.01); *G06F 2203/04806* (2013.01)

(58) Field of Classification Search
CPC combination set(s) only.
See application file for complete search history.

(56) References Cited

U.S. PATENT DOCUMENTS

| | | | |
|---|---|---|---|
| 8,654,076 B2 | 2/2014 | Ronkainen | |
| 8,966,617 B2 | 2/2015 | Hicks et al. | |
| 9,330,249 B2 | 5/2016 | Sato et al. | |
| 2008/0012835 A1* | 1/2008 | Rimon | G06F 3/038 345/173 |
| 2008/0168403 A1* | 7/2008 | Westerman | G06F 3/04883 715/863 |
| 2009/0315848 A1* | 12/2009 | Ku | G06F 3/0416 345/173 |
| 2011/0007021 A1 | 1/2011 | Bernstein et al. | |

(Continued)

FOREIGN PATENT DOCUMENTS

| | | |
|---|---|---|
| EP | 2624116 A1 | 8/2013 |
| WO | 2012027088 A2 | 3/2012 |

(Continued)

OTHER PUBLICATIONS

U.S. Appl. No. 13/801,665, filed Mar. 13, 2013, Hwang et al.

(Continued)

*Primary Examiner* — Hien L Duong
(74) *Attorney, Agent, or Firm* — Newport IP, LLC; Han Gim

(57) ABSTRACT

An apparatus may be manipulated using non-touch or hover techniques. Hover techniques may be associated with zooming, virtual feedback, authentication, and other operations. For example, a mobile device may receive data indicative of a hover gesture. The hover gesture may be sensed proximate to a rear of the mobile device. The level of zoom of a rendered image may be altered based on the hover gesture.

20 Claims, 17 Drawing Sheets

(56) References Cited

U.S. PATENT DOCUMENTS

| | | | |
|---|---|---|---|
| 2011/0018795 A1* | 1/2011 | Jang | G06F 3/0304 345/156 |
| 2011/0035691 A1* | 2/2011 | Kim | G06F 3/04817 715/765 |
| 2011/0141053 A1* | 6/2011 | Bulea | G06F 3/0416 345/174 |
| 2011/0179368 A1* | 7/2011 | King | G06F 3/04815 715/769 |
| 2013/0106777 A1 | 5/2013 | Yilmaz et al. | |
| 2013/0222329 A1* | 8/2013 | Larsby | G06F 3/04883 345/174 |
| 2013/0293490 A1* | 11/2013 | Ward | G06F 3/0488 345/173 |
| 2014/0062875 A1 | 3/2014 | Rafey et al. | |
| 2014/0132512 A1* | 5/2014 | Gomez Sainz-Garcia | G06F 3/014 345/158 |
| 2014/0189579 A1* | 7/2014 | Rimon | G06F 3/0485 715/784 |
| 2014/0282070 A1* | 9/2014 | Jeon | G06F 3/04842 715/748 |
| 2014/0362119 A1* | 12/2014 | Freund | G06F 3/017 345/661 |
| 2015/0002461 A1* | 1/2015 | Guarneri | G06F 3/04886 345/174 |
| 2015/0035779 A1* | 2/2015 | Guarneri | G06F 3/041 345/173 |
| 2015/0040076 A1* | 2/2015 | Guarneri | G06F 3/017 715/863 |
| 2015/0130725 A1 | 5/2015 | Knepper et al. | |
| 2015/0177866 A1* | 6/2015 | Hwang | G06F 3/042 345/175 |
| 2015/0261310 A1* | 9/2015 | Walmsley | G06F 1/1626 345/173 |
| 2016/0048304 A1* | 2/2016 | Niranjani | G06F 3/0488 715/800 |
| 2016/0077606 A1* | 3/2016 | Hyun | G06F 3/14 345/156 |
| 2016/0357389 A1* | 12/2016 | Dakin | G06F 3/0482 |
| 2017/0102738 A1* | 4/2017 | Park | G06F 1/1652 |
| 2017/0277381 A1* | 9/2017 | Allyn | G06F 3/033 |

FOREIGN PATENT DOCUMENTS

| | | |
|---|---|---|
| WO | 2014152560 A1 | 9/2014 |
| WO | 2015038840 A1 | 3/2015 |
| WO | 2015080339 A1 | 6/2015 |
| WO | 2015105326 A1 | 7/2015 |

OTHER PUBLICATIONS http://www.w3.org/TR/pointerevents/#compatibility-mapping-with-mouse-events; "Pointer Events"; W3C; © 2015; accessed Sep. 13, 2016; 23 pages.

https://msdn.microsoft.com/en-us/library/windows/apps/hh465383.aspx; "Quickstart: Pointers (HTML)—Windows app development"; Microsoft; © 2016; accessed Sep. 13, 2016; 22 pages.

"International Search Report and Written Opinion Issued in PCT Application No. PCT/US2017/046435", dated Nov. 14, 2017, 11 Pages.

Chen, et al., "Air+Touch: Interweaving Touch & In-Air Gestures", In Proceedings of the 27th Annual ACM Symposium on User Interface Software and Technology, Oct. 5, 2014, pp. 519-525.

Shima, et al., "AirFlip-Undo: Quick Undo Using a Double Crossing In-Air Gesture in Hover Zone", In Proceedings of the 28th Annual ACM Symposium on User Interface Software & Technology, Nov. 8, 2015, pp. 97-98.

\* cited by examiner

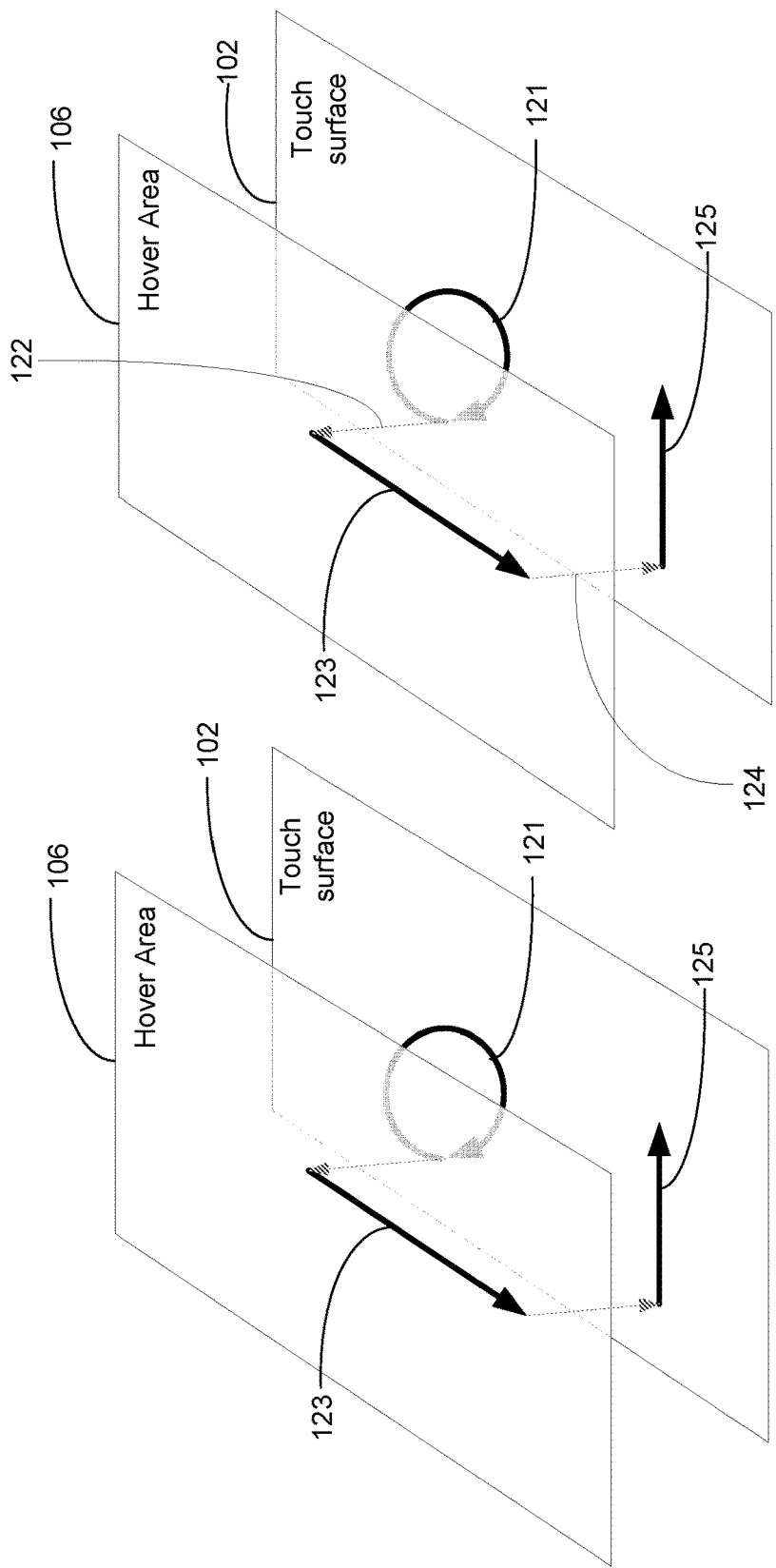

US 10,416,777 B2

DEVICE MANIPULATION USING HOVER

BACKGROUND

Conventional mobile devices may operate via touch input using a connected display. The touch input may be used to enter information, zoom-in/out on photos, scroll through pages, or otherwise interact with the mobile device. The use of touch input alone may not support all possible interactions and use of the mobile device.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Disclosed herein are method, systems, and apparatuses for manipulating a device using non-touch or hover techniques to manipulate functions on a device. Hover techniques may be associated with zooming, virtual feedback, and login security, among other scenarios.

It should be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 illustrates an example scenario for a hover gesture as disclosed herein.

FIG. 4 illustrates an example scenario for a hover gesture as disclosed herein.

Like reference numerals indicate like elements in the drawings. Elements are not drawn to scale unless otherwise indicated.

DETAILED DESCRIPTION OF ILLUSTRATIVE EXAMPLES

Disclosed herein are method, systems, and apparatuses for manipulating a device using non-touch or hover techniques to manipulate functions on a device. Hover techniques may be used for zooming, virtual feedback, and authentication, among other scenarios.

Figure 1:
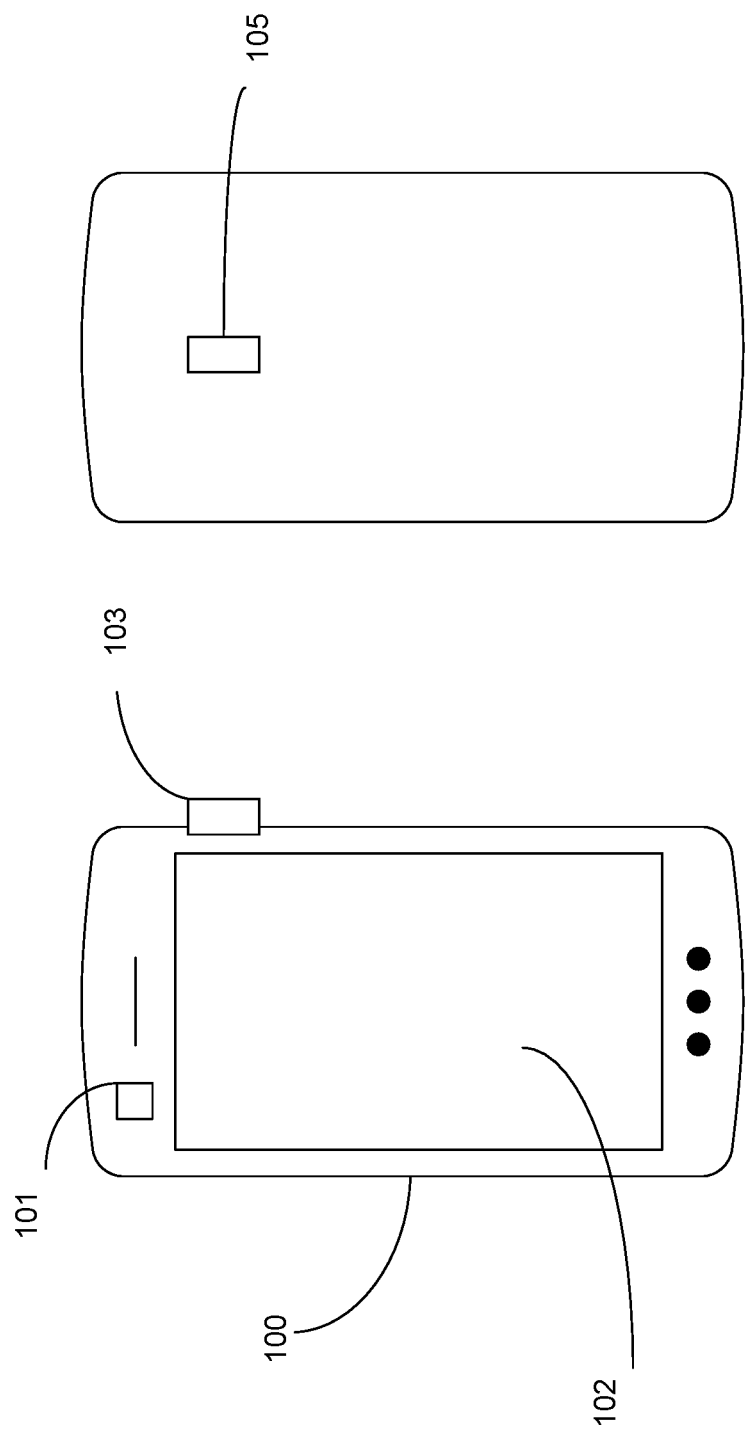
FIG. 1 illustrates an example mobile device that may implement device manipulation using hover.

FIG. 1 illustrates an example mobile device that may implement device manipulation using hovering techniques. Device manipulation may include all methods and techniques for controlling an interface such as a zooming text or drawing, scrolling pages, or authentication, among other things. Mobile device 100 includes display 102, sensor 101, sensor 103, and sensor 105. Mobile device 100 may be a personal digital assistant (PDA), a smartphone, a laptop, a netbook, tablet, or other devices. Mobile device 100 may be handheld device (e.g., smartphone), which is generally a computing device designed to fit in about the size of a standard palm. Sensor 101 may be located on a front (e.g., primary display side) of mobile device 100 and sensor 101 may assist in sensing movements proximate to the front of mobile device 100 (e.g., on or near display 102). Sensor 103 may be located on a side of mobile device 100 and may assist in sensing movements proximate to the side of mobile device 100. A side is usually parallel to a front or rear of an apparatus, such as mobile device 100. Sensor 105 may be located on a rear portion of mobile device 100 and may assist in sensing movements proximate to the rear of mobile device 100. The rear of mobile device 100 may be the side opposite a primary display (e.g., there may be a large display in front and smaller display in rear). The rear of mobile device 100 may be considered in relation to a user's position as well, such as the side opposite display 102 the user is looking towards. Sensor 101, sensor 103, and sensor 105 may be located anywhere on mobile device 100 and may provide information that indicates hovering (e.g., hover sensors). The sensing of a user's hand or other object hovering proximate to mobile device 100 may be based on capacitive sensing, but other techniques may be used, such as an ultrasonic distance sensor or camera-based sensing (images taken of user's hand to obtain distance and movement). Display 102 may include an array of touch sensors that detect and process touch events (e.g., touching of fingers or other objects upon a touch-sensitive surface at particular coordinates within x-y dimensions of the screen) and hover sensors that detect and process hover events (e.g., close proximity hovering of fingers or other objects above display 102).

Figure 2:
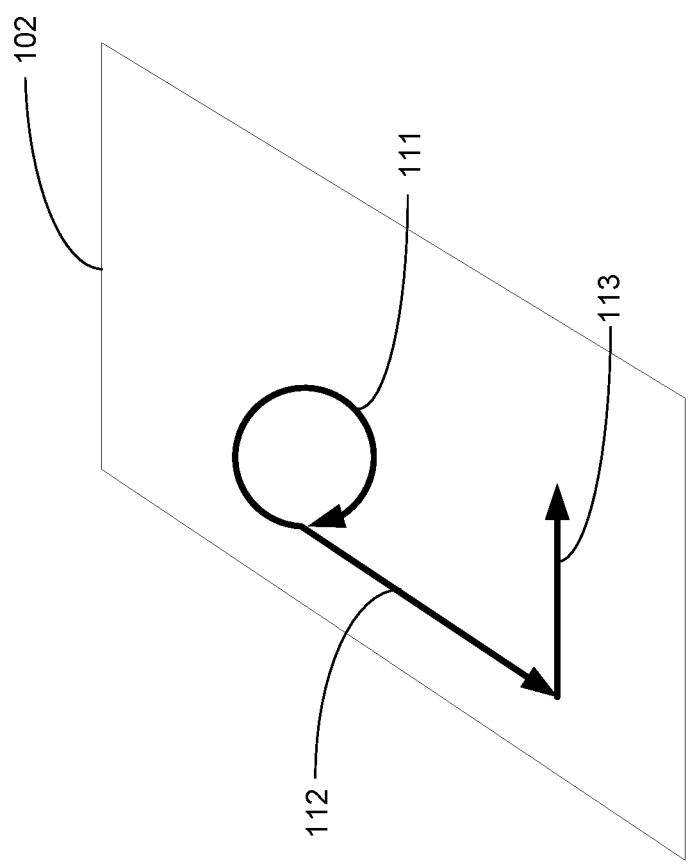
FIG. 2 illustrates an example scenario for a conventional touch gesture.

FIG. 2 illustrates an example scenario for a conventional touch gesture. Display 102 may display a logon screen in which a user touches display 102 to enter a logon pattern that authenticates access to additional functions of mobile device 100. In this conventional case of FIG. 2, there may be three different touch combinations that may be entered in order. Touch pattern 111 (a circle), touch pattern 112 (a directional line), and touch pattern 113 (a directional line) that is entered sequentially via touch.

FIG. 3 illustrates an example scenario for a hover gesture as disclosed herein. Display 102 may display a logon screen in which a user hovers or touches display 102 to enter a logon pattern that authenticates access to additional functions of mobile device 100. In the scenario shown in FIG. 3, there may be three different gesture combinations that may be entered. Login gestures may include touch pattern 121 (a circle), hover pattern 123 (a directional line) that is within hover area 106, and touch pattern 125 (a directional line). The patterns (hover or touch) may be entered in order or out of order based on predetermined authentication settings. Although hover area 106 is shown as a thin plane, it is not necessarily limited to it. Hover area 106 may be any area in proximity to mobile device 100.

FIG. 4 illustrates an example scenario for a hover gesture as disclosed herein. Display 102 may display a logon screen in which a user hovers or touches display 102 to enter a logon pattern that authenticates access to additional functions of mobile device 100. In the scenario shown in FIG. 4, there may be five different gesture combinations that may be entered in order. Login gestures may include, touch pattern 121 (a circle), hover pattern 122 (directional line away from mobile device 100), hover pattern 123 (a directional line), hover pattern 124 (directional line towards mobile device 100), and touch pattern 125 (a directional line). The patterns (hover or touch) may be entered in order or out of order based on predetermined settings.

As shown in FIG. 4, the height and movement of the hover (e.g., hover pattern 122) in relation to mobile device 100 and the movement towards mobile device 100 (e.g., hover pattern 124) may be considered for a logon scenario. Additionally, speed of completion of one gesture (or the totality of logon gestures) may be used as factors in authenticating a user. In an example, the speed of a gesture that does not touch display 102, but is in hover area 106 may not be recognized as a hover gesture for the logon process, because the system may be programmed to only attribute hover gestures to movements of a first speed range and disregard movements at other speeds. Using speed as factor may help reduce the number of unintentional hover gestures. The use of hover gestures add a different dimension to the logon process and therefore significantly increases the number of combinations of gestures (touch and hover) that may be used for passwords, which may increase levels of security.

Figure 5:
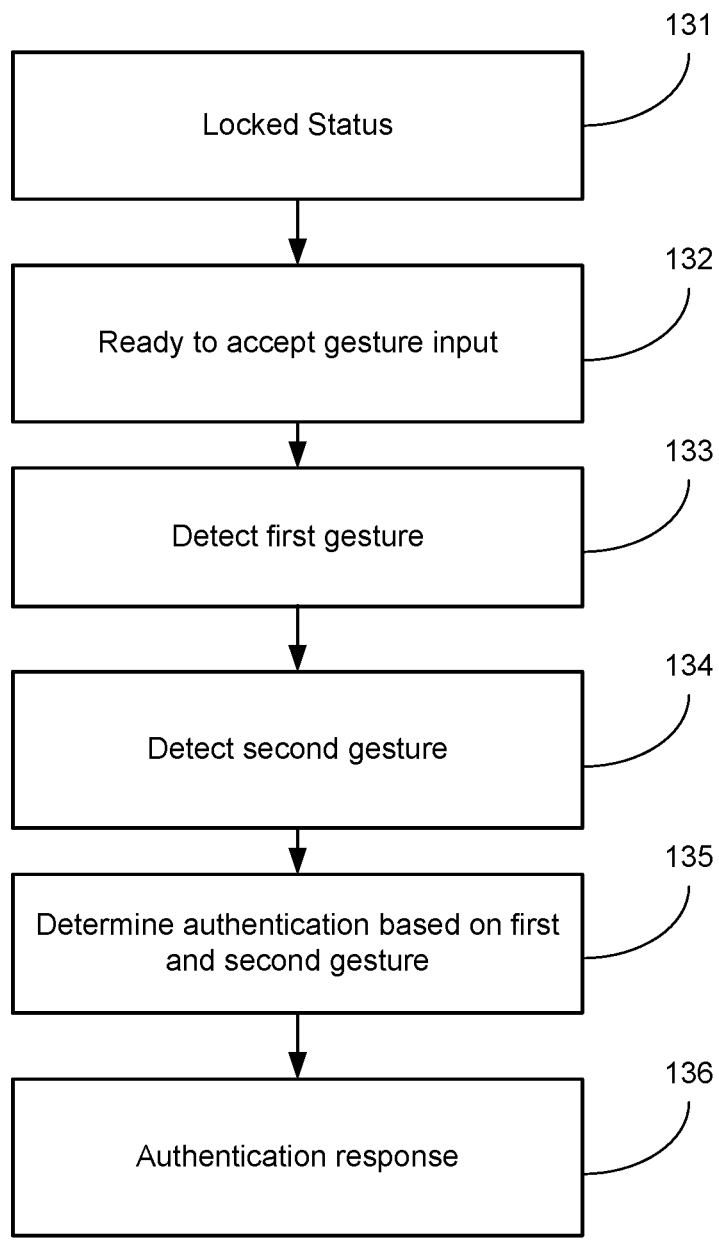
FIG. 5 illustrates an example method for device manipulation using hover as disclosed herein.

FIG. 5 illustrates an example method for device manipulation using hover as disclosed herein. At block 131, mobile device 100 or an application on mobile device 100 may be in a locked status (e.g., mobile device logon or banking application logon, respectively). At block 132, mobile device 100 is in ready position to receive gestures. This ready position may be a logon screen that is indicative of being ready to accept gesture input (e.g., screen displays "ready," "ready for gesture," "hover password," stimulus, or a picture indicating gesture logon input desired). At block 133, mobile device 100 may detect a first gesture by an object. The object may be a finger or other object. The first gesture may be a touch gesture (e.g., touch pattern 121). At block 134, mobile device 100 may detect a second gesture by an object. The second gesture may be a finger or other object. The second gesture may be a hover gesture (e.g., hover pattern 123). As discussed herein, hovering is where one or more objects (usually fingers) are detected above display 102 or other parts of mobile device 100 by a spaced distance (which may be predetermined or based on reception of a signal), but without physically touching the touch screen. Detection means that one or more sensors recognize that one or more objects are near mobile device 100. It is contemplated that the first gesture of block 133 or the second gesture of block 134 may be detected gesture on a front, side, or rear of mobile device 100.

With continued reference to FIG. 5, at block 135 the gesture of block 133 and gesture of block 134 are analyzed to determine whether they match a predetermined gesture input that indicate that a user is authenticated. Block 133 and block 134 may be examined alone or together. Analyzed gesture input that may include a speed of the gesture, the height of the gesture (distance away from mobile device 100), the sequence of the gestures, the direction of the gesture, the shape of the gesture, the alignment (position) of the gesture over a displayed image, concurrency of gestures, or position of a gesture in relation to mobile device 100 (rear, front, side, top, bottom), among other things, in any combination as discussed herein. At block 136, an authorization response may be given (e.g., mobile device 100 is unlocked). The response may include displaying a particular home screen, displaying a message indicating authentication status, playing a sound, or the like. It should be understood, as discussed in more detail herein, that stimuli (e.g., vibration, light, or sound) may be used in the gesture login process. Vibration of mobile device 100 or lack thereof in the gesture logon process may indicate whether a gesture is a hover or touch. For example, vibrations may be at the start, middle, end, or other part of hover pattern 123. The vibration of mobile device 100 may help alert the user that hover gesture is being considered in the login process. The vibration may be configured to be subtle enough so that it can just be perceived by the user of mobile device 100. Another consideration of vibration or other stimuli is to use it as directions to provide a certain gesture. For example, a user may gestures predetermined for a certain vibration or other stimuli. A relatively short vibration may indicate a square-shaped touch gesture and a long vibration may indicate a circle-shaped hover gesture. Mobile device 100 may provide a random or otherwise predetermine series of vibrations or other stimuli. In an example, if the correct gesture(s) in the correct order is provided after one or more vibrations or other stimuli then a user may be authenticated. It is contemplated herein that the use of vibrations or other stimuli as a stimulus for a known answer may allow a user to enter a "different" gesture combination for their password almost every time they logon to mobile device 100. This may make theft of login credentials by looking at a user's shoulder ineffective.

Figure 6B:
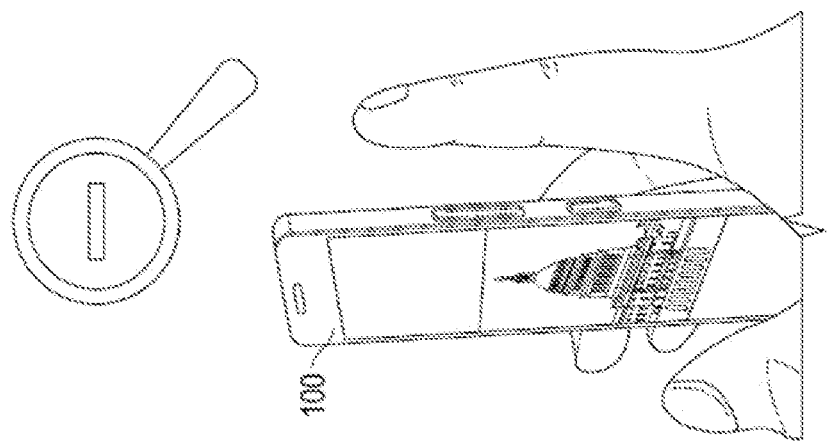
FIG. 6B illustrates an example scenario of using hover gestures for zooming with a mobile device.
Figure 6A:
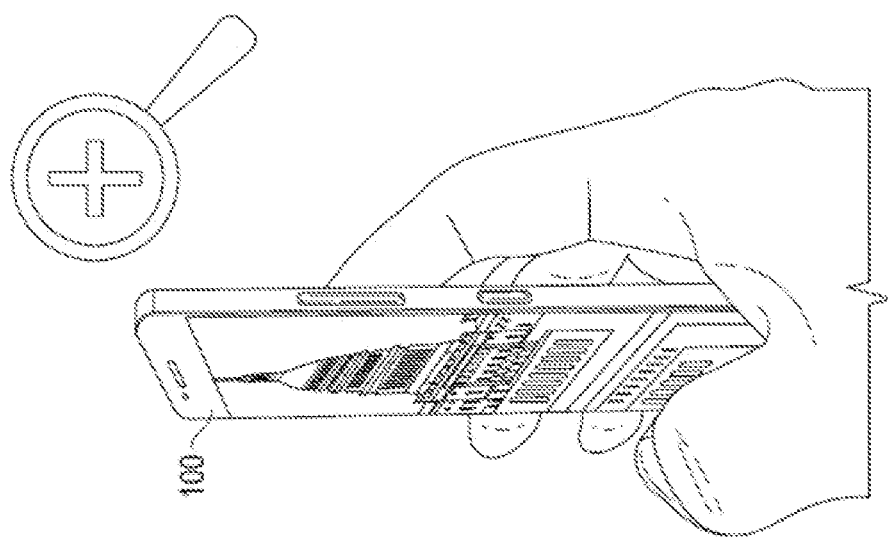
FIG. 6A illustrates an example scenario of using hover gestures for zooming with a mobile device.

Discussed below are additional considerations for device manipulation using hovering. Conventional techniques for zooming typically require two hands. Zooming may interrupt the browsing experience and may not be intuitive for some users. FIG. 6A-FIG. 6B illustrate an example scenario of using hover gestures for zooming with mobile device 100. In this scenario, the hover sensor (e.g., sensor 105 of FIG. 1) senses the rear of mobile device 100. A user may use a finger at the rear of mobile device 100 to zoom and a finger in front of the mobile device 100 for browsing. In some embodiments, the depth or height of the hover motion from the rear of mobile device 100 may serve as a zoom in-out factor. By allowing for zooming in this manner, a user may be able to use one finger or one hand for zooming, particularly with mobile devices that are handheld (e.g., smartphone). FIG. 6A illustrates a scenario where placing an index finger close to (e.g., towards mobile device 100) the rear of mobile device 100 (e.g., detected by sensor 105 of FIG. 1) provides for a zoom in, while FIG. 6B illustrates a scenario where placing an index finger away from the rear of mobile device 100 (e.g., detected by sensor 105 of FIG. 1) provides for a zoom out.

Figure 7A:
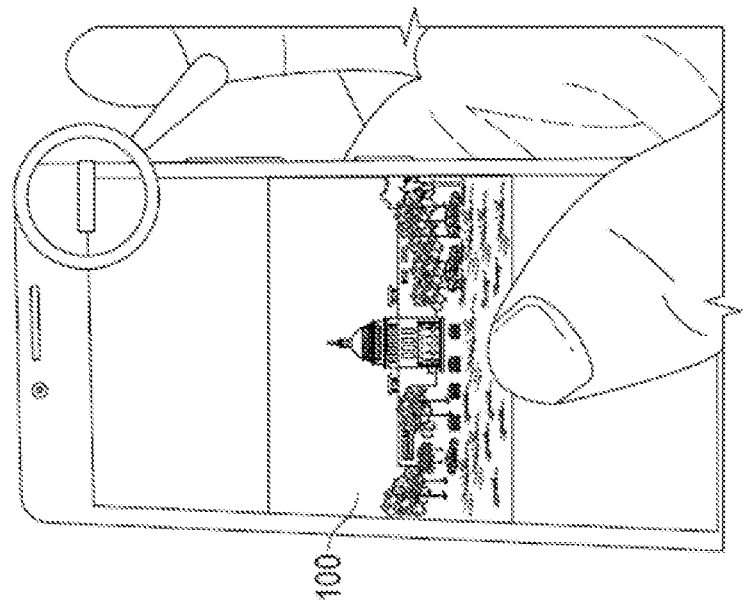
FIG. 7A illustrates a scenario placing an index finger close to the side of mobile device associated with hover as disclosed herein.
Figure 7B:
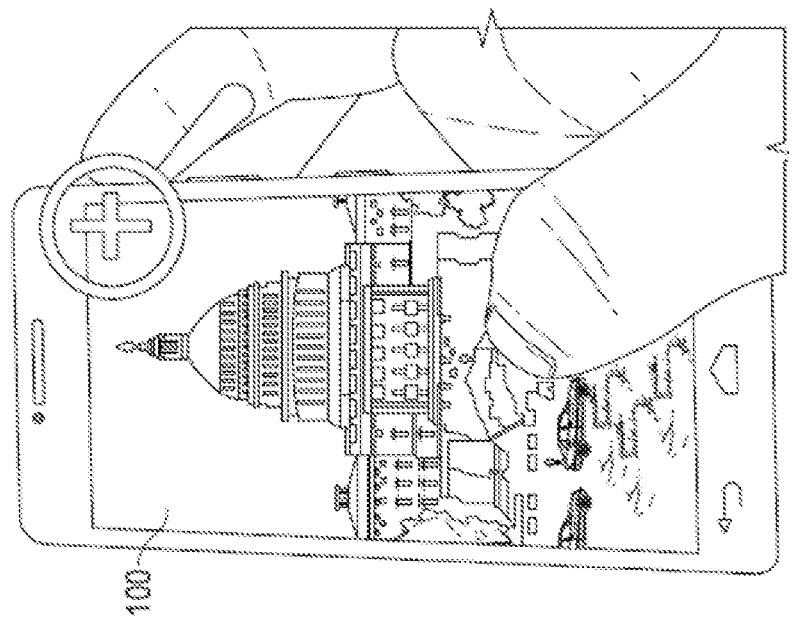
FIG. 7B illustrates a scenario placing an index finger away from the side of mobile device associated with hover as disclosed herein.

FIG. 7A illustrates a scenario where placing an index finger close (e.g., towards mobile device 100) to the side of mobile device 100 (e.g., detected by sensor 103 of FIG. 1) provides for a zoom in, while FIG. 7B illustrates a scenario where placing an index finger away from the side of mobile device 100 (e.g., detected by sensor 103 of FIG. 1) provides for a zoom out. Other scenarios are contemplated where zoom out is a close index finger (e.g., towards the device) and zoom-in is an away motion (gesture). It is also contemplated that zoom may be manipulated by use of one or a combination of the following hover gestures: finger in the front (e.g., thumb detected by sensor 101), finger in rear (e.g., index finger detected by sensor 105), or finger on the side (e.g., thumb detected by sensor 103). Further it is contemplated that that mobile device 100 may detect hover gestures or other functions associated with device manipulation as disclosed herein, but the display that displays the effect of the gestures may be a remote display (e.g., a television 6 feet away).

Figure 8:
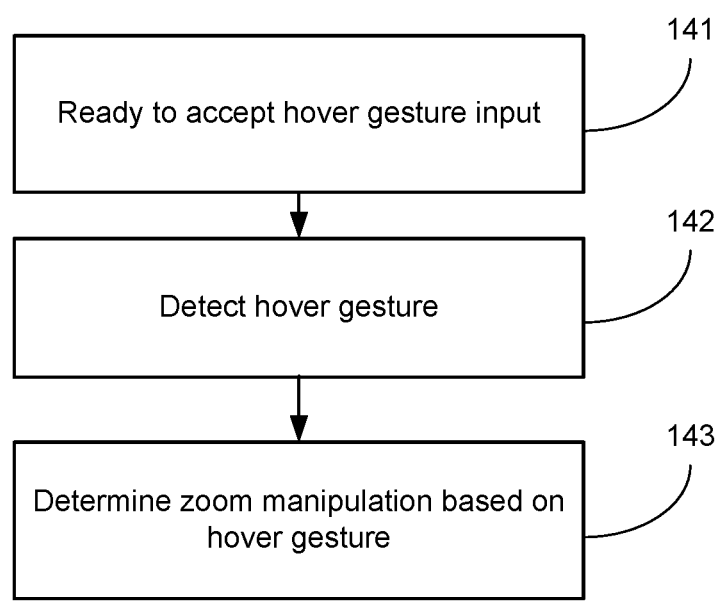
FIG. 8 illustrates an example method for device manipulation using hover as disclosed herein for zoom.

FIG. 8 illustrates an example method for device manipulation using hover as disclosed herein for zoom. At block 141, mobile device 100 is in a ready position to receive hover gestures for zooming. This ready position may be indicated by a displayed icon, image, text, or stimuli as discussed herein. At block 142, mobile device 100 may detect a hover gesture by an object. The object may be a finger or other object. The hover gesture may be an index finger moving in a direction in proximity to sensor 105 (e.g., sensor in rear of mobile device 100). At block 143, the hover gesture of block 142 is analyzed to determine whether the object is moving towards or away from mobile device 100. The analyzed hover gesture input that may include a speed of the gesture, the distance of the gesture, or the direction of the gesture, among other things. Based on the analysis of block 143 a displayed image of display 102 may be zoomed in or out (e.g., level the zoom is manipulated). The zoom may be for a particular image that is selected (e.g., an image in a web browser) or zoom for everything displayed on display 102. It should be understood, as discussed in more detail herein, that vibration or other stimuli (e.g., light, sound) may be used in the gesture zoom process as discussed herein. Vibration of mobile device 100 or lack thereof in the gesture zoom process may indicate whether hover gesture is detected and what direction it may be detected. For example, vibrations may be at the start (or end) of zoom process. Vibrations may help alert the user that hover gesture is being considered when zooming.

Figure 9:
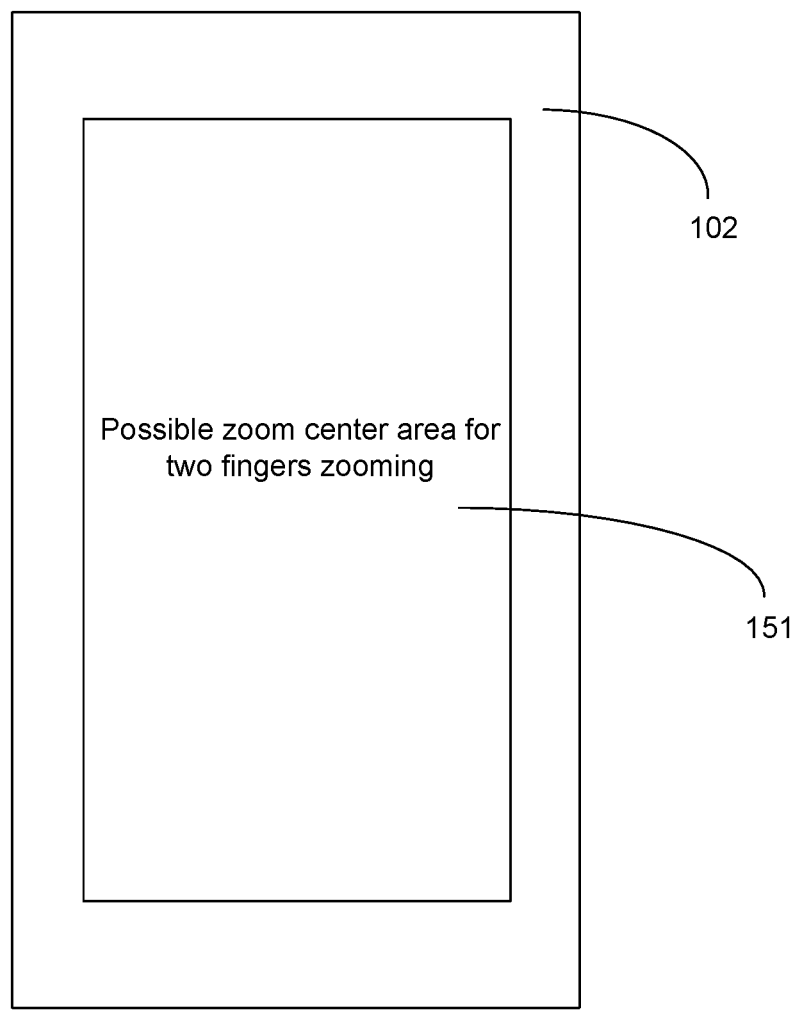
FIG. 9 illustrates a possible zoom center area for conventional two finger touch zoom on a display associated with hover as disclosed herein.
Figure 10:
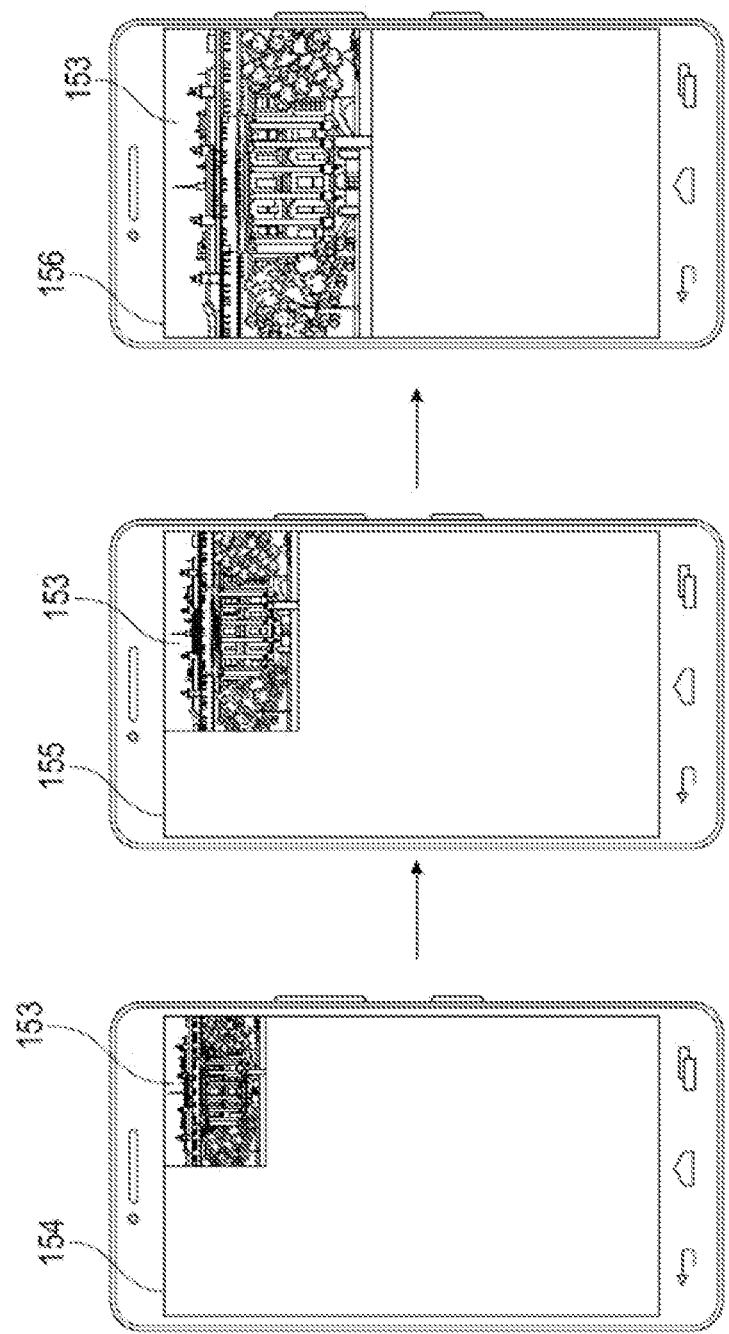
FIG. 10 illustrates an example scenario for using conventional two finger touch zoom.

Discussed below are additional considerations for device manipulation using hovering techniques. Conventional zooming using touch techniques typically uses the center of the two fingers as the center for the zooming. This limits the capability of zoom pinpoint for user—e.g., the user cannot utilize the full screen for zoom pinpoint. Referring to FIG. 9, illustrated is a possible zoom center area 151 for conventional two finger touch zoom on a display 102 of a device such as mobile device 100. The outside rectangle (the outer edges of display 102) may represent the full screen for the device. The internal rectangle may represent the possible zoom center for two fingers zooming. FIG. 10 illustrates an example scenario for using conventional two finger touch zoom. At block 154, which represents zoom area 151, image 153 is rendered at a first size. At block 155, there is an attempt to use two finger touch zoom to expand the image to max size, but as stated herein, the center of the zoom is the center of the two fingers. At block 156, image 153 is finally expanded to the maximum size which is the size of the zoom area. In summary, as shown in FIG. 10, to zoom or expand a picture on the top right corner of the screen, the user typically needs to perform at least two steps to zoom-in the picture: a first step to initially zoom-in the picture on the top right picture, and a second step to find the picture's center as the picture expands, and zoom in again. Conventional two finger zooming techniques therefore are limited to a center area that is smaller than the full size of the screen and may require two or more two finger touch zoom-in gestures.

Figure 11:
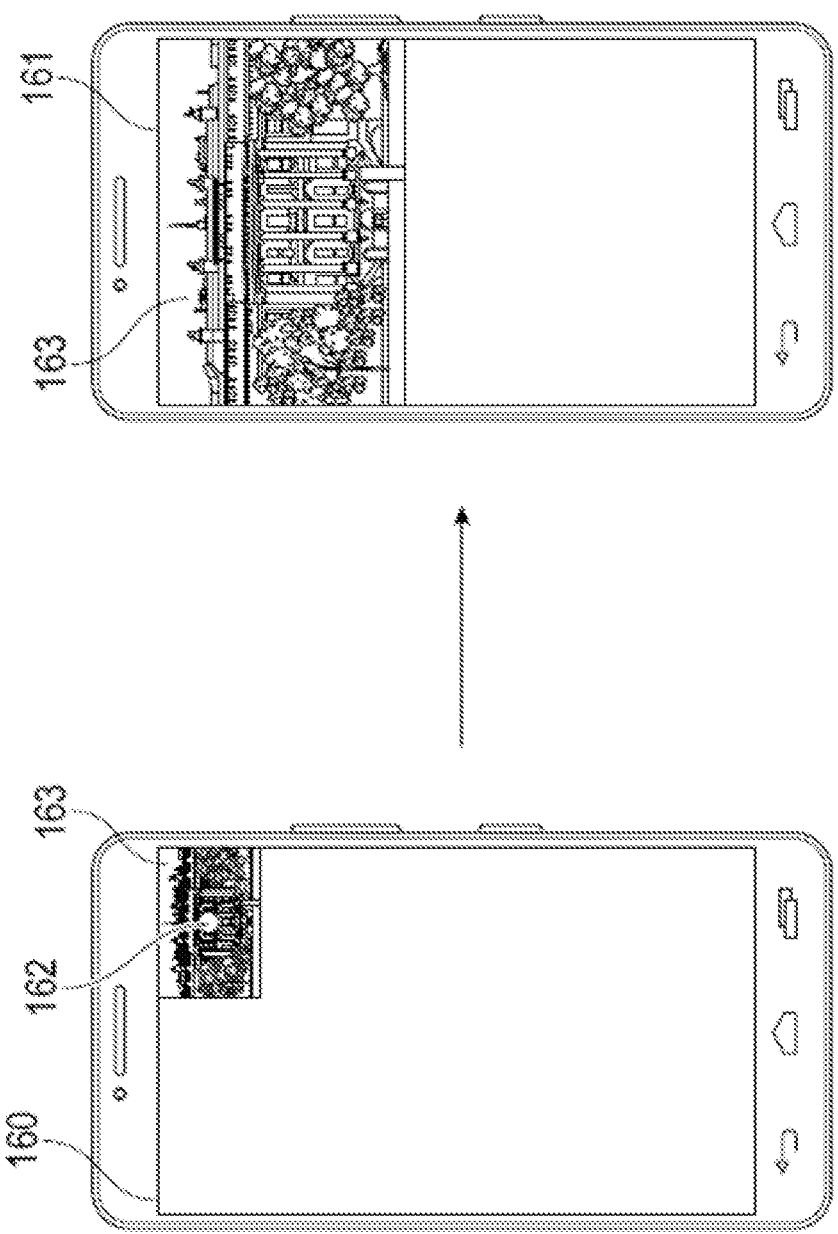
FIG. 11 illustrates an example use of hover point.

The issues as discussed in association with FIG. 9 and FIG. 10 may be alleviated by use of the hover point technique as discussed herein. A user may use a hover point to pinpoint the center of the zoom and then use two fingers to zoom. This technique changes the zoom center from being the mid-point of two fingers to a single hover point. Additionally, this technique reduces the steps required to perform a zoom from two steps to one step. FIG. 11 illustrates an example use of hover point. At block 160, hover point 162 is over image 163. A sensor detects hovering of an object (e.g., a thumb) and provides a corresponding cursor (e.g., hover point 162) that is shown on display 102. Hover point 162 may be manipulated by the hovering object. The point may be stopped at or near the center of the picture. The center may be automatically determined when hovering is detected and point 162 may be placed at or near the center because mobile device 100 determines that it is in a mode to manipulate zoom. A hovering gesture may, for example, be determined by holding a hover point in place for a defined time such as two seconds, followed by a quick gesture away or towards mobile device 100, in response to which the hover point may be "locked" into the determined center of image 163 at block 160. It is contemplated that alternatively a touch instead of hover may be used. As shown in block 161, image 163 may then be enlarged (zoomed) using a finger (e.g., a index finger in the rear or side of mobile device 100). Mobile device 100 may thus use hover point 162 as the center of image 163 rather than the midpoint of two fingers as in conventional two-finger touch point.

As discussed herein, vibration or other stimuli may be used for many hover gesture scenarios. In one embodiment, hover techniques may be implemented as virtual wheels on smart devices. However, although touch techniques, which may provide immediate feedback to the user touching the device, when using hovering techniques, the object is not actually touching the screen and thus a user may not be able to sense immediate feedback as is provided when touching the device. In some embodiments, a feedback mechanism may be implemented to help the usability of hover with a smart device. Feedback may include vibration or other stimuli for hover with a virtual wheel. In some embodiments, the time length of the vibration may be proportional to the speed or length of the virtual wheel.

Figure 12B:
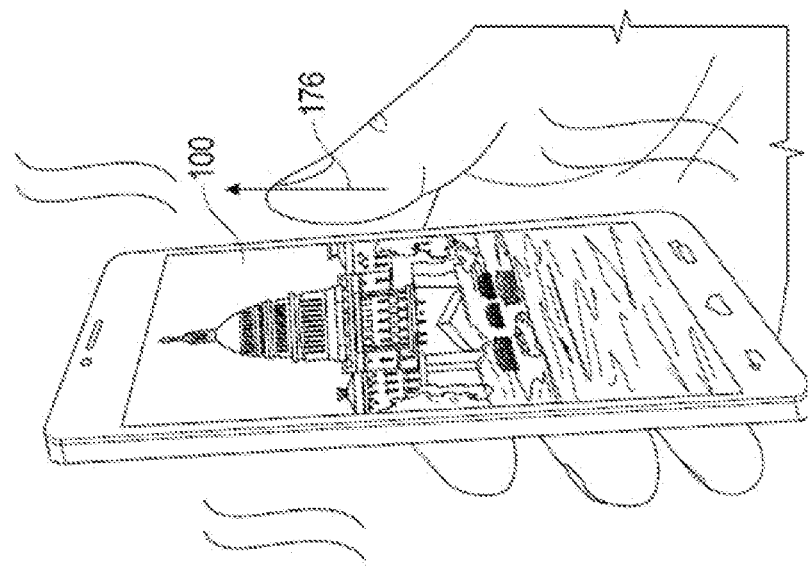
FIG. 12B illustrates example feedback for scrolling using a hover gesture.
Figure 12A:
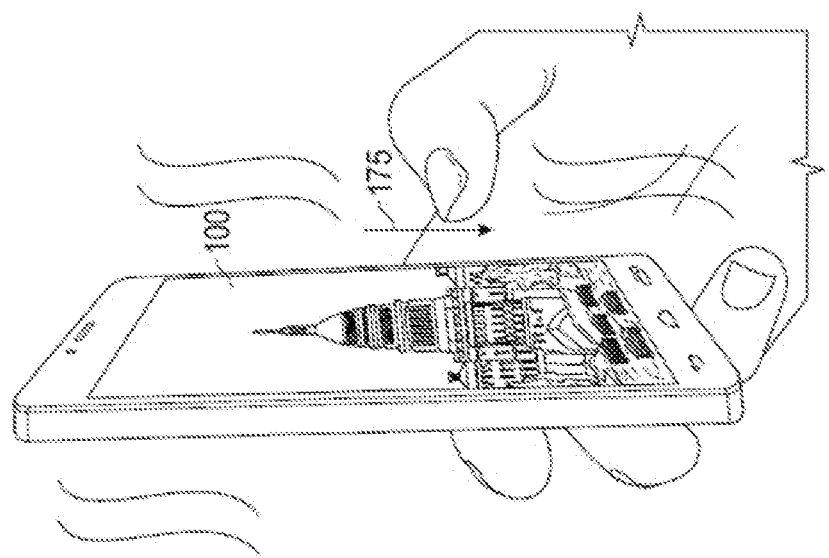
FIG. 12A illustrates example feedback for scrolling using a hover gesture.

FIG. 12A and FIG. 12B illustrates example feedback for scrolling using a hover gesture with vibration or other stimuli. As shown in FIG. 12A and FIG. 12B, a vibration and buzzing sound (or other sound) may be implemented for a thumb moving down (e.g., arrow 175) or thumb moving up (e.g., arrow 176), respectively. The speed of the thumb movement (or other object) may indicate how fast a page should be scrolled and the speed of the thumb movement may determine the intensity of the sound or vibration. A slow scroll may cause mobile device 100 to use short pulses of vibration and associated buzzing sound spaced over a relatively long period of time, while a fast scroll may be long duration vibrations and associated buzzing sound spaced over a relatively short period of time. Other alerts (e.g., flickering of images on display or sounds) are contemplated for feedback when using a scroll gesture or other hover gesture.

Figure 13:
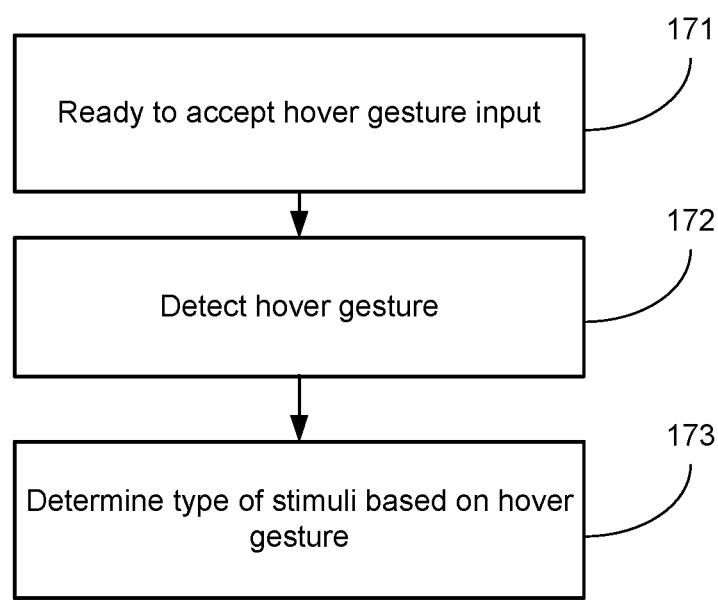
FIG. 13 illustrates an example method for device manipulation using hover as disclosed herein for feedback.

FIG. 13 illustrates an example method for device manipulation using hover as disclosed herein for feedback. At block 171, mobile device 100 is in a ready state to receive hover gestures for manipulation of mobile device 100 (e.g., drawing or scrolling a page). This ready state may be displayed with an icon or stimuli. At block 172, mobile device 100 may detect a hover gesture by an object. The object may be a finger or other object. The hover gesture may be an index finger moving in one or more directions in proximity to sensor 101 or sensor 103 (e.g., sensor in front or side of mobile device 100). At block 173, the hover gesture of block 172 is analyzed to determine direction of movement of the object relative to mobile device 100. The hover gesture input that may be analyzed may include a speed of the gesture, the distance of the gesture, or the direction of the gesture, among other things. Based on the analysis of block 173 a displayed image of display 102 may be manipulated in correspondence with the gesture and stimuli, such as sound (buzzer) or vibration, may correspond to the gesture (e.g., long buzzing and vibration for fast movements, short buzzing and vibration for slower movements, or another type of sound and vibration based on change in direction). It should be understood, as discussed in more detail herein, that vibration or other stimuli (e.g., light, sound) may be used in other processes that use hover gestures. Vibration or other stimuli or lack thereof in the hover gesture process may indicate whether hover gesture is detected and what direction it may be detected. For example, vibrations may be at the start (or end) of a hover gesture such as a hover gesture associated with scrolling. Vibration of mobile device 100 may thus alert the user that a hover gesture has been recognized as well as the direction or speed of the hover gesture.

Some predetermined hover gestures may include a tickle movement, wherein the user moves his/her fingertip back and forth in a rapid motion to mimic tickling, or a circle movement, or a check movement (like a user is checking a box), etc. Specific gestures include, but are not limited to (1) finger hover pan—float a finger above the screen and pan the finger in any direction; (2) finger hover tickle/flick—float a finger above the screen and quickly flick the finger as like a tickling motion with the finger; (3) finger hover circle—float a finger above the screen and draw a circle or counter-circle in the air; (4) finger hover hold—float a finger above the screen and keep the finger stationary; (5) palm swipe—float the edge of the hand or the palm of the hand and swipe across the screen; (6) air pinch/lift/drop—use the thumb and pointing finger to do a pinch gesture above the screen, drag, then a release motion; (7) hand wave gesture—float hand above the screen and move the hand back and forth in a hand-waving motion. Additional hover considerations may include: 1) Scroll Up/Down without touch by detecting side grip; 2) Pinch-Zoom while hovering to zoom in the page; 3) "Follow the finger"—Fish-Eye Zoom part of the webpage user is hovering; and 4) "Back to Top/Bottom of page" with double tap on side grip top/bottom respectively.

In some embodiments, hover events may be exposed as mouse-over events in Native IE, SL WBC, WebView, and WWA by linking hover events to touch events such pointerover, pointerenter, pointerleave etc. Example pointer events are shown in Table 1.

TABLE 1

Pointer Events to wire Hover to

| Event | Description |
|---|---|
| gotpointercapture | Dispatched prior to the dispatch of the first event after pointer capture is set for a pointer. |
| lostpointercapture | Dispatched after pointer capture is released for a pointer. |

When a user hovers over a webpage on a supported device, hover events may be linked to mouse pointer events which enable the underlying page to respond to those mouse pointer events. Table 2 is an example decision table that illustrates a determination of which contact may become a primary contact.

TABLE 2

| Initial State | Change | Reaction |
|---|---|---|
| No Contacts | New Contact1 | Contact1 becomes primary |
| Contact1 is primary | New Contact2 | No reaction |
|  | Contact 1 is still hovering. Contact2 touches. | Contact2 becomes primary |
|  | Contact2 out of range Contact3 enters | Contact1 does not become primary but Contact3 is primary. Once the primary goes away, there's just no primary until a new contact comes in range. Existing contacts may be configured to never become primary. Once a state of "No contacts" is gotten back to, the table becomes applicable again. |

Example event ordering scenarios may include touch down, lifting up, moving the contact (in-contact), moving the contact—hover (pen/future-touch), and moving the contact causing manipulation to begin, are discussed below. Touching down on an element may produce the following sequence of events on the hit tested node of a WM_PointerDown message: mousemove, MSPointerOver, mouseover, mouseenter, MSPointerDown, mousedown.

Example pointer and mouse capture are discussed below. msSetPointerCapture(1) may produce the same mouse event order as setCapture(true), including onlosecapture events. Mouse container capture—setCapture(true) may produce the same pointer event order as msSetPointerCapture(1). Modeling Approach Testing, which may include possible combination of testing methods, event types, containers, among other things, are shown in Table 3.

TABLE 3

| setCapture | Pointer Event | Mouse Event | Container | Target | Prevent MouseEvent |
|---|---|---|---|---|---|
| Pointer Event | MSPointerHover | Mouseover | HTML Elements | HTML Elements | yes |
| Mouse Event Pointer & Mouse Events | MSPointerOver MSPointerDown MSPointerMove | mouseenter mousedown mousemove | Document Iframe Window | document Iframe ActiveX object | no |
| | MSPointerUp | Mouseup | SVG Elements | SVG Elements | |
| | MSPointerOut | Mouseout mouseleave Click Dblclick | | | |

Other hover or touch related events may be used, such as ITouchInputClient Events, Internet Explorer Pointer Events, Internet Explorer Mouse Events, and WWA Pointer Events. Web browser pointer events may be dispatched on a per-contact basis based on the contact flags. Browser mouse events—See http://www.w3.org/TR/pointerevents/#compatibility-mapping-with-mouse-events (which is incorporated by reference herein in its entirety) for how pointer events are translated to mouse events. WWA Pointer Events—See http://msdn.microsoft.com/en-us/library/windows/apps/hh465383.aspx (which is incorporated by reference herein in its entirety) provides an overview of how pointer point events work in WWAs. WWAs offer an extension to the standard browser Pointer Events to access additional data through projected WinRT PointerPoints. See http://msdn.microsoft.com/en-us/library/windows/apps/windows.ui.input-.pointerpoint.aspx for an overview of WinRT PointerPoints, which is incorporated by reference herein in its entirety. Through projection, a WWA developer may be able to access the existing PointerPoint properties along with the new zdistance pointer property.

Figure 14:
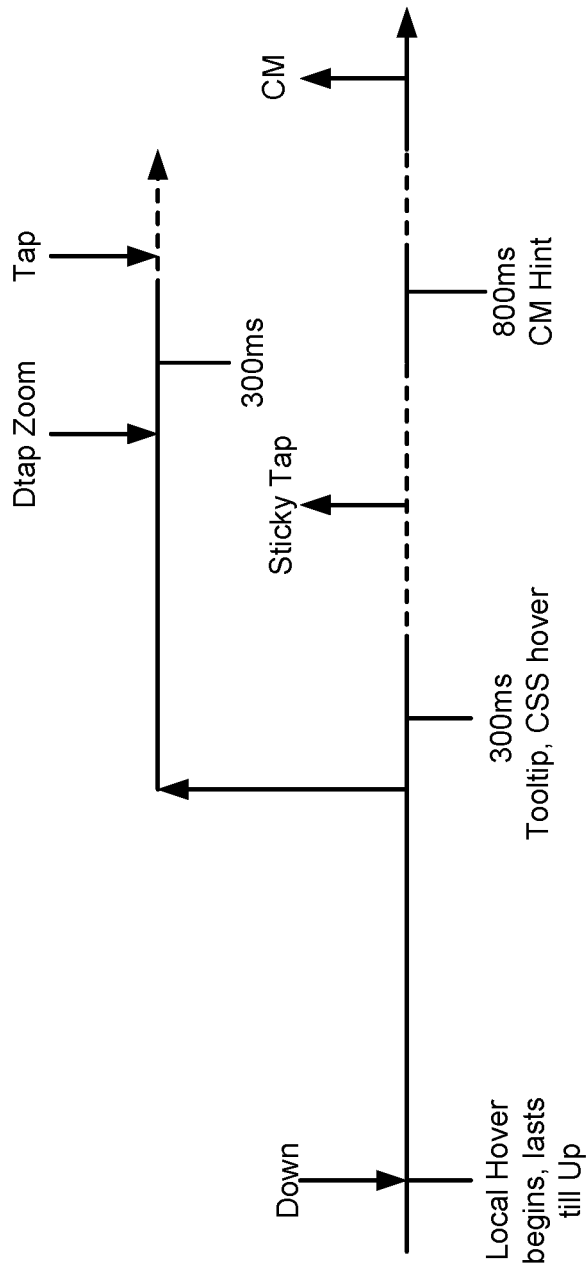
FIG. 14 illustrates an example timeline that represents what may happen depending on how long a touchpoint is down.

An example hover and context menu are discussed below. FIG. 14 illustrates an example timeline that represents what may happen depending on how long a touchpoint is down. It also details the timing for a Dtap Zoom vs. a new tap. Consider the following: 1) Local hover—:hover pseudo selectors are applied to a limited number of elements based on the hittest; 2) Full CSS hover—the :hover selectors are tunneled up the rest of the tree as usual; and 3) DTap Zoom—page is zoomed around the element that was double tapped. Table 4 shows an example scenario and example result.

TABLE 4

| Scenario | Expected Result |
|---|---|
| Up after < 300 ms, on whitespace | Nothing (unless there is a tap listener) |
| Up after < 300 ms, on text, no secondary tap | No display change, word selected after up |
| Up after < 300 ms, on link, no secondary tap | Link active while down, link visited after up, navigation after 300 ms (to confirm no dtap) |
| Up after < 300 ms, second tap < 300 ms, | Local hover during first down, zoom to area |
| Up after < 300 ms, second tap > 300 ms, on text | Select text after first tap, CM on second tap |
| Up after < 300 ms, second tap > 300 ms, on space | Nothing (unless there is a tap listener) |
| Up after > 300 ms and < 800 ms on text | Local immediately, CSS after 300 ms, word selected |
| Up after > 300 ms and < 800 ms on link with no menu | Local immediately, CSS after 300 ms, Navigate to link |
| Up after > 300 ms and < 800 ms on link with menu | Local immediately, CSS and menu after 300 ms. On up: hover styles remain, no out events, menu stays up |
| Up after < 800 ms | Local immediately, square hint at 800 ms, CM on up |
| Drag off at any point | This dismisses whatever action has happened. |
| Tap a link in the menu | Events are turned back on for the secondary menus, primary menu is still visible, primary link still isn't clicked |
| Tap a link with a menu after the menu is activated | Now we navigate |

Described herein is an example of browser interaction. With regard to caching and what to cache, travel log entries may be stored. Backward and forward travel log entries may be cached. Regarding when to cache, the timing may be important because the cache is typically consistent with the underlying travel log, otherwise what can be seen may not be what the user is navigating to.

Figure 15:
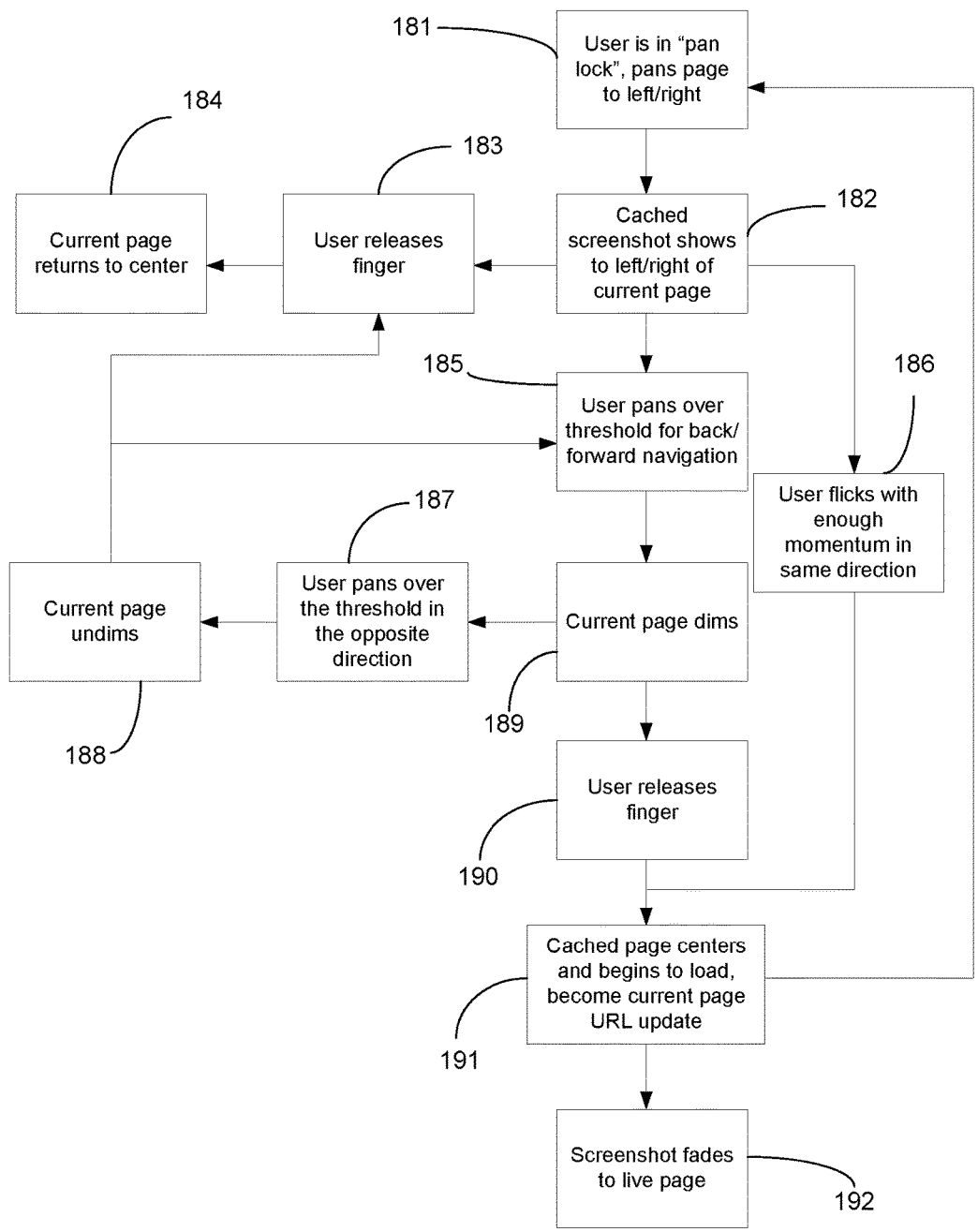
FIG. 15 illustrates an example method flow of a user interaction associated with hover as disclosed herein.

FIG. 15 illustrates an example method flow of a user interaction using hover techniques. As shown in FIG. 15, there are many revisited routes as steps are executed. For example, when a current page undims at block 188 it may go to block 183 or block 188 as indicated by the arrows. The aforementioned was highlighted to make it clear that there are different routes, which is not necessarily indicated in the recitation below. At block 181 a user may be in "pan lock", which pans page left or right. At block 182, a cached screenshot shows left or right of current page. At block 183, a user releases finger. At block 814, a current page returns to center. At block 185, a user pans over a threshold for back or forward navigation. At block, 189, current page dims. At block 187, user pans over the threshold in the opposite direction. At block current 188, current page undims. At block 190, a user releases finger and at block 191 cached page centers and begins to load and becomes current page with URL update. At block 192, screen shot fades to live page. At block 186, a user may flick with enough momentum in same direction to bring up cached page, which may center when loaded at block 191.

With continued reference to FIG. 15, for typical navigation, a user may, for example, navigate to a new page in their browser by clicking a link (or some similar action that results in navigation). From the user's perspective, in some aspects there may be little or no difference before and after hover functionality is enabled. The underlying functionality may listen to specific events in order to update cached entries. With regard to gesture back or forward navigation and animation, in the example, a user may be provided with a screenshot of the previous or next page, and navigation may begin when the user lifts his or her finger and the page boundary is crossed. Normal page navigation may then be implemented. In one example, the user may enter the gesture navigation mode when performing a horizontal pan. The browser may behave in a similar manner to normal touch inputs in terms of vertical pan or free, pan or flick, and so on. As long as user lifts up their finger, an animation may be rendered to slide in the target page. With regard to rotation, the zooming functionality may be in an active state during back or forward pan and the corresponding animation. Rotation may be initiated when the zooming functionality is idle. With regard to crossfading transition, when a user navigates to a previous page, there may be latency between the time that the page has been selected for navigation and the time the page is rendered. An immersive browser may provide a crossfading transition which may maintain a current screenshot until either page is ready or a timer expires. In some examples, crossfading transition may be provided and the timing may be tuned to provide the desired user experience.

Figure 16:
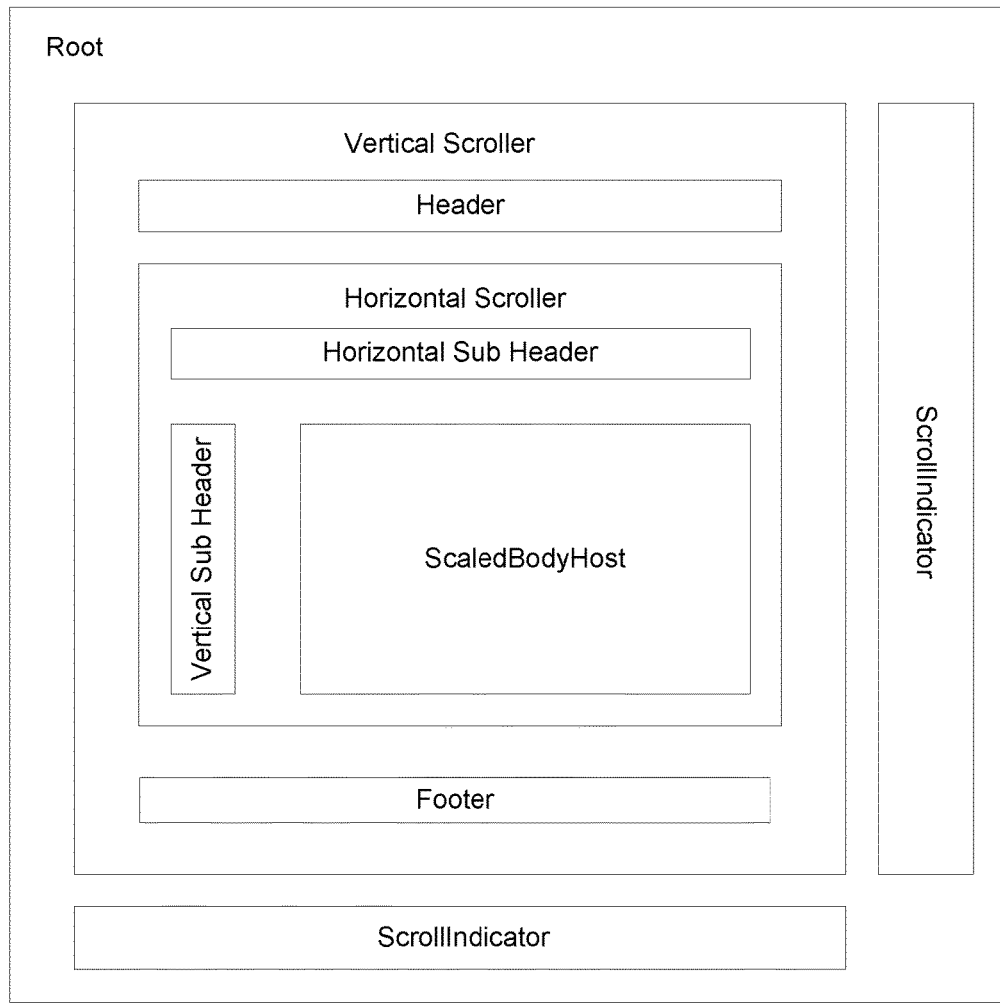
FIG. 16 illustrates an example UI tree associated with hover as disclosed herein.
Figure 17:
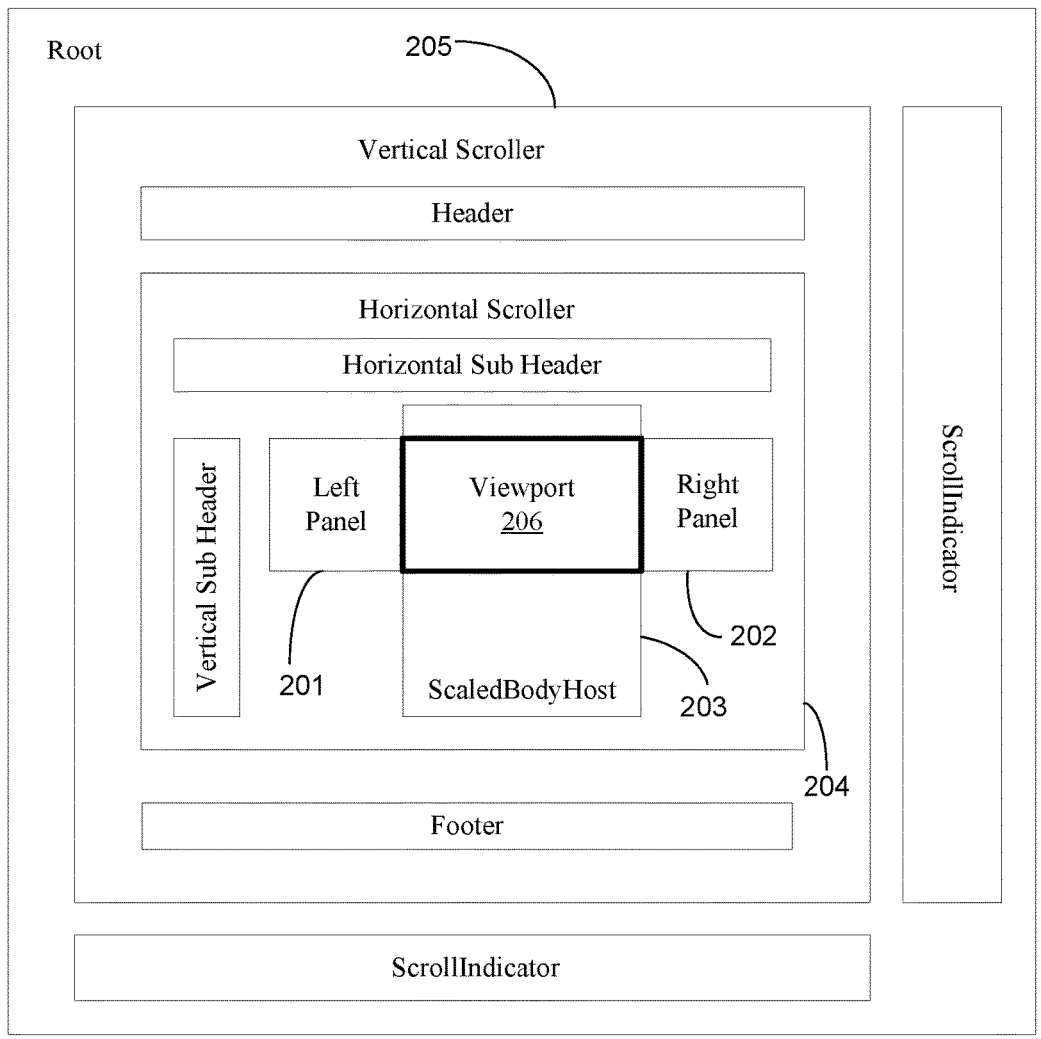
FIG. 17 illustrates an updated UI tree associated with hover as disclosed herein.

FIG. 16 illustrates an example user interface (UI) tree for a zoom function. FIG. 17 illustrates an updated UI tree for the zoom function. As shown in FIG. 17, two additional panels (e.g., left panel 201 and right panel 202) may be placed alongside with ScaledBodyHost 203 (where the WBC resides) inside the horizontal scroller 204 so that they can move together with ScaledBodyHost 203 horizontally. Because of the vertical scroller 205, the entire content inside horizontal scroller 204 may be moved vertically. Left panel 201 and right panel 202 may align themselves with the viewport 206 position so that they can be seen whenever the users pan left or right. To address this issue, AnchorLayout may be used, which allows placement to the sides of ScaledBodyHost 203 using AnchorEdges. In another example, the two panels (left panel 201 and right panel 202) may be located alongside with the zoom function control without changing the zoom function control internally.

With continued reference to the multi-panel zoom function, an overlay panel may provide the following: 1) cover the bodyhost during the transition phase as the original page may remain a short time before navigation begins, and the overlay panel may ensure that the user will not see the original page; 2) provide a cross-fading effect before the page is rendered on the screen, and the overlay panel may show the screenshot temporarily and cross-fade once the page is rendered. A timer may be added in the overlay panel UI to control the cross-fading effect. The overlay panel may reside with the Left or Right panels, and may be shown when the slide-in animation is complete.

With reference to the multi-panel zoom function, in some examples additional properties may be added, such as adding properties to the zoom function to represent the left/right panels and their associated model objects. Meanwhile, in order to show/hide the panels which align with the viewport programmatically, a new API may be exposed from ZoomerModel.

With reference to the multi-panel zoom function, changes to SpWebBrowserControl may be implemented. A WEB-ZoomerHost UI may initialize the zoom function control with more properties. For the multi-panel zoom function, there may be a new class within web browser model, e.g., Class Name="WebBrowserControlMultiPanels".

Described herein is slide-in animation support. Once the user lifts up his/her finger, the target page may slide in using an animation based on the last position. With continued reference to the slide-in animation support, there may be multiple cases in terms of the last position. In one case, the left panel is shown and the threshold crossed (middle of the page). The left panel may be slide-in with an animation. In another case, the left panel may be shown but does not cross the threshold. The body host may slide-in with animation. In another case, both the left and right panel may be out-of-view. In this case the left or right panels may be hidden without further changes. In a fourth case, the right panel may be shown but does not cross the threshold. The body host may slide-in with an animation. In a fifth case, the right panel may be shown and the threshold crossed. The right panel may slide-in with an animation.

Figure 18:
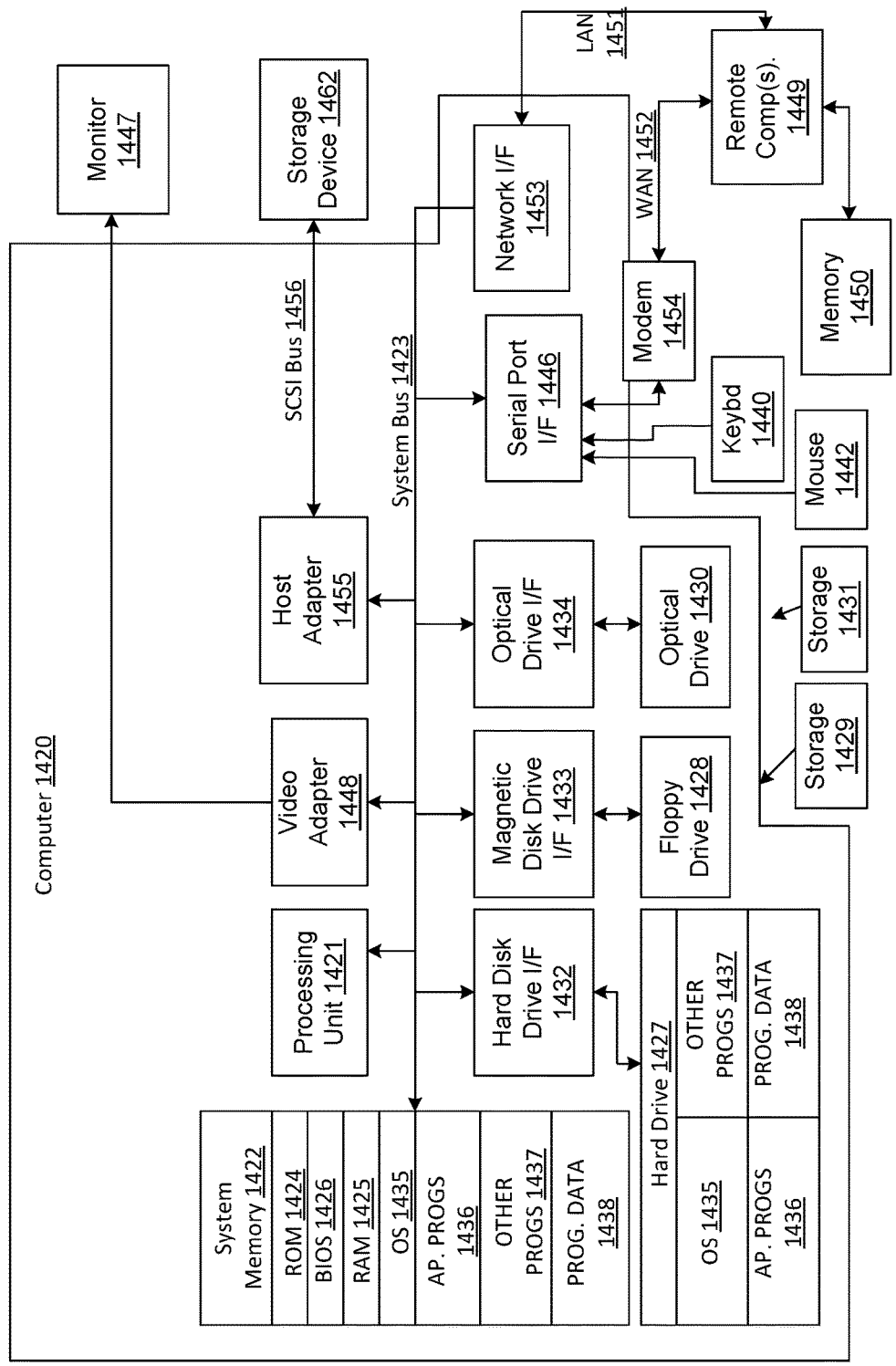
FIG. 18 illustrates an example computing environment in which the methods and systems disclosed herein or portions thereof may be implemented with regard to hover as disclosed herein.

FIG. 18 and the following discussion are intended to provide a brief general description of a suitable computing environment in which the methods and systems disclosed herein and/or portions thereof may be implemented with regard to device manipulation using hover. Although not required, the methods and systems disclosed herein is described in the general context of computer-executable instructions, such as program modules, being executed by a computer (e.g., mobile device 100), such as a client workstation, server, personal computer, or mobile computing device such as a smartphone. Generally, program modules include routines, programs, objects, components, data structures and the like that perform particular tasks or implement particular abstract data types. Moreover, it should be appreciated the methods and systems disclosed herein and/or portions thereof may be practiced with other computer system configurations, including hand-held devices, multi-processor systems, microprocessor-based or programmable consumer electronics, network PCs, minicomputers, mainframe computers and the like. The methods and systems disclosed herein may also be practiced in distributed computing environments where tasks are performed by remote processing devices that are linked through a communications network. In a distributed computing environment, program modules may be located in both local and remote memory storage devices.

FIG. 18 is a block diagram representing a computer system in which aspects of the methods and systems disclosed herein and/or portions thereof may be incorporated. As shown, the example computing system includes a computer 1420 (e.g., mobile device 100) or the like, including a processing unit 1421, a system memory 1422, and a system bus 1423 that couples various system components including the system memory to the processing unit 1421. The system bus 1423 may be any of several types of bus structures including a memory bus or memory controller, a peripheral bus, and a local bus using any of a variety of bus architectures. The system memory includes read-only memory (ROM) 1424 and random access memory (RAM) 1425. A basic input/output system 1426 (BIOS), containing the basic routines that help to transfer information between elements within the computer 1420, such as during start-up, is stored in ROM 1424.

The computer 1420 may further include a hard disk drive 1427 for reading from and writing to a hard disk (not shown), a magnetic disk drive 1428 for reading from or writing to a removable magnetic disk 1429, and an optical disk drive 1430 for reading from or writing to a removable optical disk 1431 such as a CD-ROM or other optical media. The hard disk drive 1427, magnetic disk drive 1428, and optical disk drive 1430 are connected to the system bus 1423 by a hard disk drive interface 1432, a magnetic disk drive interface 1433, and an optical drive interface 1434, respectively. The drives and their associated computer-readable media provide non-volatile storage of computer readable instructions, data structures, program modules and other data for the computer 1420. As described herein, computer-readable media is an article of manufacture and thus not a transient signal.

Although the example environment described herein employs a hard disk, a removable magnetic disk 1429, and a removable optical disk 1431, it should be appreciated that other types of computer readable media which can store data that is accessible by a computer may also be used in the example operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on the hard disk, magnetic disk 1429, optical disk 1431, ROM 1424 or RAM 1425, including an operating system 1435, one or more application programs 1436, other program modules 1437 and program data 1438. A user may enter commands and information into the computer 1420 through input devices such as a keyboard 1440 and pointing device 1442. Other input devices (not shown) may include a microphone, joystick, game pad, satellite disk, scanner, or the like. These and other input devices are often connected to the processing unit 1421 through a serial port interface 1446 that is coupled to the system bus, but may be connected by other interfaces, such as a parallel port, game port, or universal serial bus (USB). A monitor 1447 or other type of display device is also connected to the system bus 1423 via an interface, such as a video adapter 1448. In addition to the monitor 1447, a computer may include other peripheral output devices (not shown), such as speakers and printers. The example system of FIG. 18 also includes a host adapter 1455, a Small Computer System Interface (SCSI) bus 1456, and an external storage device 1462 connected to the SCSI bus 1456.

The computer 1420 may operate in a networked environment using logical connections to one or more remote computers, such as a remote computer 1449. The remote computer 1449 may be a personal computer, a server, a router, a network PC, a peer device or other common network node, and may include many or all of the elements described above relative to the computer 1420, although only a memory storage device 1450 has been illustrated in FIG. 18. The logical connections depicted in FIG. 18 include a local area network (LAN) 1451 and a wide area network (WAN) 1452. Such networking environments are commonplace in offices, enterprise-wide computer networks, intranets, and the Internet.

When used in a LAN networking environment, the computer 1420 is connected to the LAN 1451 through a network interface or adapter 1453. When used in a WAN networking environment, the computer 1420 may include a modem 1454 or other means for establishing communications over the wide area network 1452, such as the Internet. The modem 1454, which may be internal or external, is connected to the system bus 1423 via the serial port interface 1446. In a networked environment, program modules depicted relative to the computer 1420, or portions thereof, may be stored in the remote memory storage device. It will be appreciated that the network connections shown are example and other means of establishing a communications link between the computers may be used.

Computer 1420 may include a variety of computer readable storage media. Computer readable storage media can be any available media that can be accessed by computer 1420 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1420. Combinations of any of the above should also be included within the scope of computer readable media that may be used to store source code for implementing the methods and systems described herein. Further, computer 1420 may include sensing systems, such as a camera, accelerometers, magnetometers, and gyroscopes, for device manipulation using hover as discussed herein. Any combination of the features or elements disclosed herein may be used in one or more examples.

In describing preferred examples of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. The specific features, acts, and mediums are disclosed as example forms of implementing the claims This written description uses examples to disclose the invention, including the best mode, and also to enable any person skilled in the art to practice the invention, including making and using any devices or systems and performing any incorporated methods. Proximity, as discussed herein, may mean, for example, beyond 1 mm but within 1 cm, beyond 1 mm but within 8 cm, within 10 cm, or other combinations of ranges. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for means for manipulating operation of a mobile device based on gestures such as hover gestures or the like. A method, system, computer readable storage medium, or apparatus has means for detecting a first gesture, wherein the first gesture comprises a hover gesture; and altering a level of zoom of an image based on the first gesture. The first gesture may be sensed at a rear of the mobile device. The first gesture may be sensed at a side of the mobile device. The altering of the level of zoom of the image may be based further on the first gesture and a second gesture. The second gesture may be a hover gesture that is performed on a side of an apparatus that does not correspond to the side of the apparatus the first gesture was performed. The method, system, computer readable storage medium, or apparatus has means for providing stimuli based on the first gesture. The method, system, computer readable storage medium, or apparatus has means for providing stimuli based on the first gesture, wherein the stimuli comprises vibrating of the mobile device. The method, system, computer readable storage medium, or apparatus has means for providing stimuli based on the first gesture, wherein the stimuli comprises a sound from the mobile device. The altering of the level of zoom of the image may be based further on: receiving an indication of a point on the image to base the zoom, the indication of the point on the image based on hover input. The altering of the level of zoom of the image is based further on: receiving an indication of a point on the image to base the zoom, the indication of the point on the image based on hover input, wherein the point on the image is an approximate center point of the image. The first gesture may be responsive to a stimulus, the stimulus comprising vibrating of an apparatus. All combinations in this paragraph (including the removal or addition of steps) are contemplated in a manner that is consistent with the detailed description.

The subject matter described herein is provided by way of illustration. Various modifications and changes may be made to the subject matter described herein without following the examples and applications illustrated and described (e.g., skipping, removing, or adding steps), and without departing from the true spirit and scope the disclosed subject matter, which is set forth in the following claims.

What is claimed is:

1. An apparatus for interface control comprising:
   a processor; and
   a memory coupled with the processor, the memory comprising executable instructions that when executed by the processor cause the processor to effectuate operations comprising:
   receiving, from a sensor communicatively coupled with the apparatus, data indicative of a first hover gesture, wherein the first hover gesture is sensed proximate to the apparatus;
   detecting that the first hover gesture is a combination of two or more of a speed of the first hover gesture, a height of the first hover gesture, a direction of the first hover gesture, a shape of the first hover gesture, an alignment of the first hover gesture over a displayed image, and a position of the first hover gesture;
   based on the detection:
      linking the first hover gesture as one of a mouse-over or a mouse pointer event; and
      when the first hover gesture is a mouse pointer event, determining a timing that a touchpoint is down, and based on the timing, determining whether the mouse pointer event is a double-tap or a new tap; and
   inputting the mouse-over or a mouse pointer event to an application running on the apparatus.

2. The apparatus of claim 1, wherein the inputting is based further on the first hover gesture and a second hover gesture, wherein the first hover gesture and the second hover gesture are sensed proximate to a front of the apparatus and a rear of the apparatus.

3. The apparatus of claim 1, wherein the inputting is based further on the first hover gesture and a second hover gesture, wherein the first hover gesture and the second hover gesture are sensed proximate to a side of the apparatus and a rear or front of the apparatus.

4. The apparatus of claim 1, wherein the inputting is based further on:
   receiving an indication of a point on an image, the indication of the point on the image based on hover input.

5. The apparatus of claim 1, wherein the inputting is based further on:
   receiving an indication of a point on the image, the indication of the point on the image based on hover input, wherein the point on the image is an approximate center point of the image.

6. The apparatus of claim 1, wherein the apparatus is a handheld device.

7. The apparatus of claim 1, further comprising providing stimuli based on the first hover gesture.

8. The apparatus of claim 1, further comprising providing a stimulus based on the first hover gesture, wherein the stimulus comprises vibrating of the apparatus.

9. The apparatus of claim 1, further comprising providing stimulus based on the first hover gesture, wherein the stimulus comprises a sound from the apparatus.

10. The apparatus of claim 1, wherein the first hover gesture is responsive to a stimulus, the stimulus comprising vibrating of the apparatus.

11. A method for interface control comprising:
    receiving, by a mobile device from a sensor, data indicative of a first hover gesture, wherein the first hover gesture is sensed proximate to the mobile device;
    detecting that the first hover gesture is a combination of two or more of a speed of the first hover gesture, a height of the first hover gesture, a direction of the first hover gesture, a shape of the first hover gesture, an alignment of the first hover gesture over a displayed image, and a position of the first hover gesture;
    based on the detection:
       linking the first hover gesture as one of a mouse-over or a mouse pointer event; and
       when the first hover gesture is a mouse pointer event, determining a timing that a touchpoint is down, and based on the timing, determining whether the mouse pointer event is a double-tap or a new tap; and
    inputting the mouse-over or a mouse pointer event to an application.

12. The method of claim 11, wherein the inputting is based further on the first hover gesture and a second hover gesture, wherein the first hover gesture and the second hover gesture are sensed proximate to a front of the mobile device and a rear of the mobile device.

13. The method of claim 11, wherein the inputting is based further on the first hover gesture and a second hover gesture, wherein the first hover gesture and the second hover gesture are sensed proximate to a side of the mobile device and a rear or front of the mobile device.

14. The method of claim 11, wherein the inputting is based further on:
    receiving an indication of a point on the image to base a zoom, the indication of the point on the image based on hover input.

15. The method of claim 11, wherein the inputting is based further on:
  receiving an indication of a point on the image to base a zoom, the indication of the point on the image based on hover input, wherein the point on the image is an approximate center point of the image.

16. The method of claim 11, wherein the mobile device is a smartphone.

17. The method of claim 11, further comprising providing stimuli based on the first hover gesture.

18. The method of claim 11, further comprising providing a stimulus based on the first hover gesture, wherein the stimulus comprises vibrating of the mobile device.

19. A system for interface control comprising:
  a display device;
  a processor communicatively coupled with the display device; and
  a memory communicatively coupled with the processor, the memory comprising executable instructions that when executed by the processor cause the processor to effectuate operations comprising:
  receiving, from a sensor communicatively coupled to the system, data indicative of a first hover gesture, wherein the first hover gesture is sensed proximate to the display device;
  detecting that the first hover gesture is a combination of two or more of a speed of the first hover gesture, a height of the first hover gesture, a direction of the first hover gesture, a shape of the first hover gesture, an alignment of the first hover gesture over a displayed image, and a position of the first hover gesture;
  based on the detection:
    linking the first hover gesture as one of a mouse-over or a mouse pointer event; and
    when the first hover gesture is a mouse pointer event, determining a timing that a touchpoint is down, and based on the timing, determining whether the mouse pointer event is a double-tap or a new tap; and
  inputting the mouse-over or a mouse pointer event to an application running on the system.

20. The system of claim 19, wherein the inputting is based further on:
  receiving an indication of a point on the image to base a zoom, the indication of the point on the image based on hover input, wherein the point on the image is an approximate center point of the image.

* * * * *